(12) United States Patent
Ishikawa et al.

(10) Patent No.: US 7,939,213 B2
(45) Date of Patent: May 10, 2011

(54) FUEL CELL SYSTEM AND ELECTRIC VEHICLE INCLUDING THE FUEL CELL SYSTEM

(75) Inventors: Tetsuhiro Ishikawa, Nishikamo-gun (JP); Hiroshi Yoshida, Chiryu (JP); Hitoshi Sato, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 906 days.

(21) Appl. No.: 10/565,101

(22) PCT Filed: Aug. 18, 2004

(86) PCT No.: PCT/IB2004/002683
§ 371 (c)(1),
(2), (4) Date: Jan. 19, 2006

(87) PCT Pub. No.: WO2005/018979
PCT Pub. Date: Mar. 3, 2005

(65) Prior Publication Data
US 2006/0257698 A1    Nov. 16, 2006

(30) Foreign Application Priority Data

Aug. 25, 2003   (JP) .................. 2003-300028

(51) Int. Cl.
*H01M 8/04* (2006.01)
*B60L 11/18* (2006.01)
(52) U.S. Cl. ........ 429/432; 429/400; 429/428; 429/430; 180/65.31; 320/132; 320/148; 320/149

(58) Field of Classification Search .................. 429/12, 429/22, 400, 428, 430, 432; 180/65.31; 320/132, 320/148, 149
See application file for complete search history.

(56) References Cited

U.S. PATENT DOCUMENTS
2001/0053950 A1    12/2001  Hasegawa et al.
2003/0118876 A1*    6/2003  Sugiura et al. .................. 429/9

FOREIGN PATENT DOCUMENTS
DE    101 61 965 A1    7/2002
EP    1 286 405 A1    2/2003
JP    2001-307758 A    11/2001
WO    WO 2004/049488 A2    6/2004

OTHER PUBLICATIONS

Electromotive Force, Britannica Online Encylopedia, accessed Jun. 22, 2009, http://www.search.eb.com/eb/print?tocID=9032313&fullArticle=false.*

* cited by examiner

*Primary Examiner* — Ula C Ruddock
*Assistant Examiner* — Amanda Barrow
(74) *Attorney, Agent, or Firm* — Kenyon & Kenyon LLP

(57) ABSTRACT

In a fuel cell system in which load electric power is supplied from a fuel cell and a secondary battery, intermittent operation is performed, that is, operation of the fuel cell is stopped and the load electric power is supplied from the secondary battery in a low load region. At this time, a threshold value for stopping and starting the operation of the fuel cell is adjusted according to open circuit voltage. Thus, it is possible to prevent fuel from being unnecessarily consumed in order to maintain the open circuit voltage at a predetermined value when the operation of the fuel cell is stopped, and to improve response of the fuel cell when the operation of the fuel cell is restarted after the open circuit voltage has decreased in the fuel cell that has stopped generating electric power.

11 Claims, 6 Drawing Sheets

F I G . 2
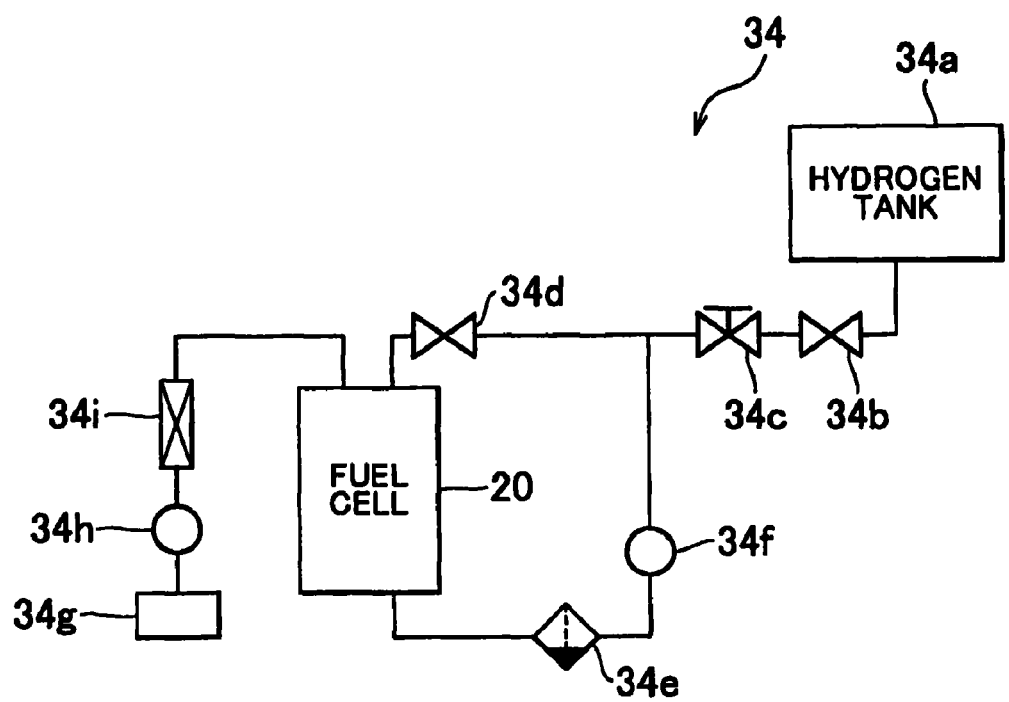
F I G . 3
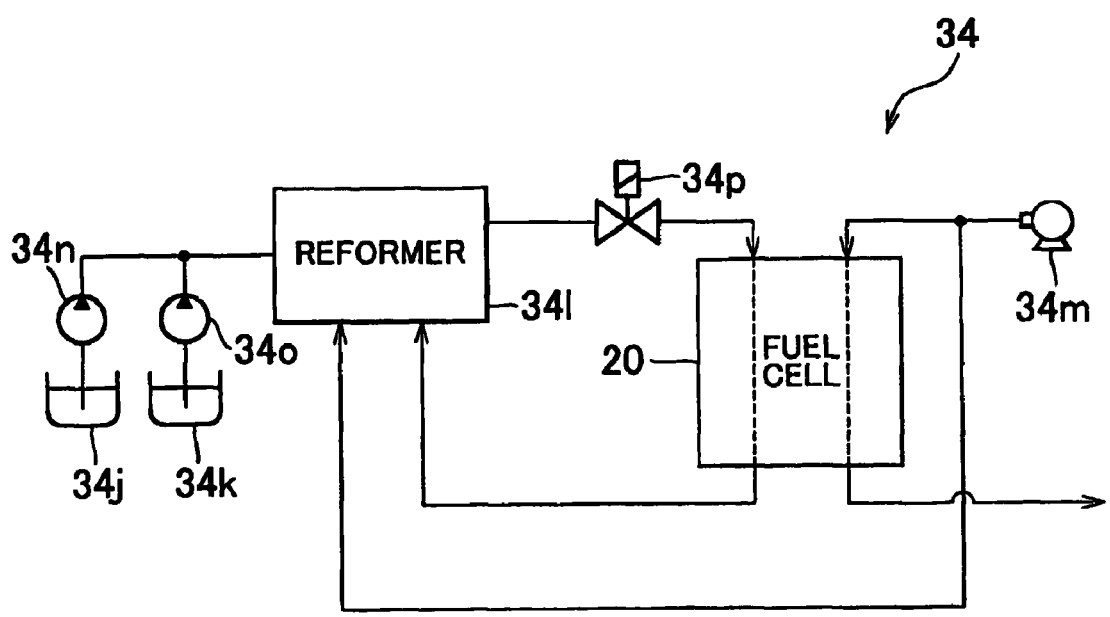

FUEL CELL SYSTEM AND ELECTRIC VEHICLE INCLUDING THE FUEL CELL SYSTEM

INCORPORATION BY REFERENCE

This is a 371 national phase application of PCT/IB2004/002683 filed 18 Aug. 2004, claiming priority to Japanese Patent Application No. 2003-300028 filed 25 Aug. 2003, the contents of which are incorporated herein by reference.

BACKGROUND OF THE INVENTION

1. Field of the Invention

The invention relates to a fuel cell system and an electric vehicle. More specifically, the invention relates to a fuel cell system including a fuel cell and an electric power storing means, and an electric vehicle including the fuel cell system.

2. Description of the Related Art

Improvement of energy efficiency is required in an electric vehicle including a fuel cell system. For example, Japanese Patent Laid-Open Publication No. 2001-307758 discloses a fuel cell system in which a required amount of electric power is supplied from a fuel cell and a secondary battery when a load is higher than a reference value, and the required amount of electric power is supplied from the secondary battery with operation of the fuel cell being stopped when the load is equal to or lower than the reference value. In the fuel cell system, the fuel cell is operated intermittently such that operation of the fuel cell is temporarily stopped in a low load region where efficiency of the fuel cell system decreases, and the fuel cell is operated in a region where energy conversion efficiency is high, whereby efficiency of the entire fuel cell system is improved.

Although the efficiency of the entire fuel cell system is improved by intermittently operating the fuel cell, a load fluctuates frequently in an electric vehicle. Therefore, in the case where the fuel cell is intermittently operated, when operation of the fuel cell is temporarily stopped and electric power supply from the fuel cell is temporarily stopped, the operation of the fuel cell needs to be restarted in a short time. Accordingly, an air compressor and a hydrogen pump (auxiliary machinery) may be operated so that open circuit voltage (OCV) at an output end of the fuel cell can be maintained at a predetermined value even while electric power supply from the fuel cell is stopped. In this case, however, hydrogen (fuel) is consumed by the fuel cell in order to maintain the open circuit voltage, and accordingly fuel efficiency deteriorates.

SUMMARY OF THE INVENTION

Accordingly, it is an object of the invention to provide a fuel cell system in which a fuel cell is operated intermittently, efficiency of the entire fuel cell system can be improved, and response of the fuel cell can be improved, that is, a time required for restarting the fuel cell system that has been stopped can be reduced.

Also, it is another object of the invention to provide an electric vehicle including a fuel cell and a secondary battery, in which efficiency of the entire fuel cell system can be improved, and response of the vehicle can be improved.

In order to achieve the aforementioned objects, the invention relates to a fuel cell system including a fuel cell, electric power storing device, and electric power supplying device for supplying electric power to a load from the fuel cell and the electric power storing device. In the fuel cell system, the electric power supplying device includes intermittent operation device for stopping operation of the fuel cell when an amount of electric power required by the load is smaller than a reference value, and starting the stopped operation of the fuel cell when the amount of electric power required by the load is equal to or larger than the reference value, and threshold value adjusting device for adjusting the reference value according to internal electromotive force in the fuel cell whose operation has been stopped.

With the configuration, since the threshold value for starting the operation of the fuel cell is adjusted according to the internal electromotive force (open circuit voltage) generated by remaining fuel gas in the fuel cell, the operation of the fuel cell can be restarted in a short time. Accordingly, even when supply of fuel (hydrogen) to the fuel cell is completely stopped during intermittent operation of the fuel cell, the fuel cell can be restarted quickly. Thus, the efficiency of the fuel cell system during the intermittent operation can be improved, and operability of the fuel cell system during the intermittent operation can be improved, that is, a starting response time of the fuel cell system can be reduced.

In the fuel cell system, the electric power supplying device may include the intermittent operation device for stopping the operation of the fuel cell when the amount of electric power required by the load is smaller than a first reference value, and starting the operation of the fuel cell when the amount of electric power required by the load is equal to or larger than a second reference value, and the threshold adjusting device for adjusting the second reference value according to the internal electromotive force in the fuel cell whose operation has been stopped. The electric power storing device stores electric energy. For example, a secondary battery (storage battery), a capacitor, or a so-called ultra capacitor (a capacitor having a large capacity) is employed as the electric power storing device.

With the configuration, since the threshold value for starting the operation of the fuel cell is adjusted according to the internal electromotive force (open circuit voltage) generated by remaining fuel gas in the fuel cell, the operation of the fuel cell can be restarted in a short time, as in the aforementioned fuel cell system according to the invention. Accordingly, even when supply of fuel (hydrogen) to the fuel cell is completely stopped during intermittent operation of the fuel cell, the operation of the fuel cell can be restarted quickly. Thus, the efficiency of the fuel cell system during the intermittent operation can be improved, and operability of the fuel cell system during the intermittent operation can be improved, that is, the starting response time of the fuel cell system can be reduced. Also, since a determination value (threshold value) for determining whether the operation of the fuel cell needs to be started is different from a determination value (threshold value) for determining whether the operation of the fuel cell needs to be stopped, occurrence of hunting can be prevented.

The threshold value adjusting device may decrease the second reference value according to a decrease in the internal electromotive force in the fuel cell such that a time at which the operation of the fuel cell is started is relatively advanced.

Also, the threshold value adjusting device may store data related to the second reference value that needs to be set according to the internal electromotive force in the fuel cell. The data may be stored as a table or a function.

Also, the electric power storing device may include at least one of a secondary battery (or a storage battery) and a capacitor that are charged with electric power by the fuel cell.

The invention relates to an electric vehicle including a motor that generates power for the vehicle, and a fuel cell system that includes a fuel cell, an electric power storing device and an electric power supplying device for supplying electric power to the motor from the fuel cell and the electric power storing device. In the electric vehicle, the electric power supplying device includes intermittent operation device for stopping operation of the fuel cell when an amount of electric power required by the load including the motor is smaller than a reference value, and starting the stopped operation of the fuel cell when the amount of electric power required by the load is equal to or larger than the reference value, and threshold adjusting device for adjusting the reference value according to internal electromotive force in the fuel cell whose operation has been stopped.

In the electric vehicle, the electric power supplying device may include intermittent operation device for stopping operation of the fuel cell when an amount of electric power required by the load including the motor is smaller than a first reference value, and starting the operation of the fuel cell when the amount of electric power required by the load is equal to or larger than a second reference value, and threshold adjusting device for adjusting the second reference value according to internal electromotive force in the fuel cell whose operation has been stopped.

With the configuration, even when fuel supply to the fuel cell is completely stopped during the intermittent operation of the fuel cell, it is possible to prevent deterioration of response of the fuel cell when the fuel cell is restarted. Accordingly, it is possible to improve both of the fuel efficiency and response (for example, accelerator response) of the electric vehicle.

According to the invention, since fuel supply to the fuel cell can be completely stopped when the operation of the fuel cell is stopped during the intermittent operation of the fuel cell, the fuel efficiency can be improved. Also, even when fuel supply to the fuel cell is completely stopped, since the threshold value for starting the operation of the fuel cell is set according to remaining internal electromotive force (open circuit voltage), it is possible to suppress a delay in the restart of the operation of the fuel cell (response of the fuel cell).

BRIEF DESCRIPTION OF THE DRAWINGS

The above mentioned and other objects, features, advantages, technical and industrial significance of this invention will be better understood by reading the following detailed description of exemplary embodiments of the invention, when considered in connection with the accompanying drawings, in which:

FIG. 2 is a block diagram explaining auxiliary machinery (in a case where hydrogen gas is used);

FIG. 3 is a block diagram explaining auxiliary machinery (in a case where reformate gas is used);

DETAILED DESCRIPTION OF THE PREFERRED EMBODIMENTS

Figure 4A:
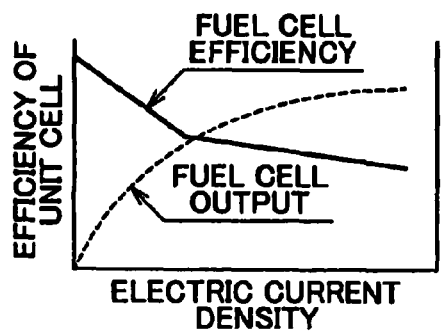
FIG. 4A to FIG. 4C are graphs each explaining efficiency of the fuel cell system.
Figure 4B:
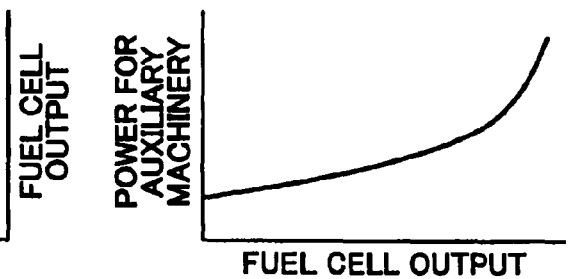
Figure 4B:
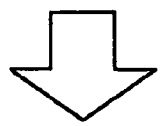
Figure 4C:
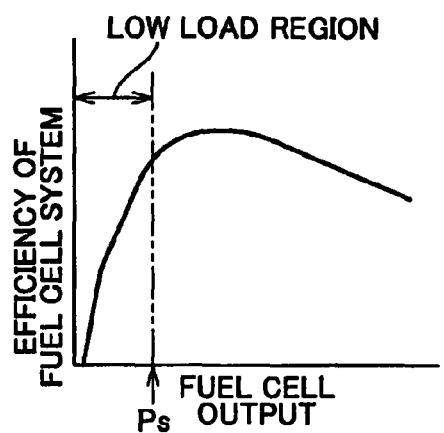

In the following description and the accompanying drawings, the present invention will be described in more detail in terms of exemplary embodiments. First, efficiency of a fuel cell system will be described. Each of FIGS. 4A, 4B, and 4C is a graph showing efficiency of a fuel cell. FIG. 4A is a graph showing a relation between an electric current density, and efficiency of a unit cell (fuel cell efficiency) and fuel cell output. FIG. 4B is a graph showing a relation between power for auxiliary machinery and fuel cell output. FIG. 4C is a graph showing a relation between the fuel cell output and efficiency of the fuel cell system.

Meanwhile, auxiliary machinery such as an air compressor and a pump for supplying fuel gas (oxygen and hydrogen gas) to the fuel cell requires power that substantially increases with an increase in a supply gas amount (fuel cell output). Even when the fuel cell output is low, the auxiliary machinery requires a predetermined amount of power (see FIG. 4B). As a result, the efficiency of the fuel cell system decreases as the fuel cell output decreases, as shown in FIG. 4C. For example, the efficiency of the fuel cell system is represented by a value obtained by dividing, by a gas supply amount, an amount of electric power obtained by subtracting an amount of electric power required for driving the auxiliary machinery from an amount of generated electric power.

Accordingly, electric power supply from a fuel cell 20 is stopped, and electric power is supplied from a secondary battery (electric power storing means) in a low load region where a load required of the fuel cell is lower than a reference value Ps (i.e., a region where the efficiency of the fuel cell system is relatively low). Meanwhile, in a high load region where the load required of the fuel cell is equal to or higher than the reference value Ps (i.e., a region where the efficiency of the fuel cell system is relatively high), electric power is supplied to the load from the fuel cell and the secondary battery, whereby the efficiency of the fuel cell system can be improved. This is one reason why the fuel cell is intermittently operated.

Figure 5:
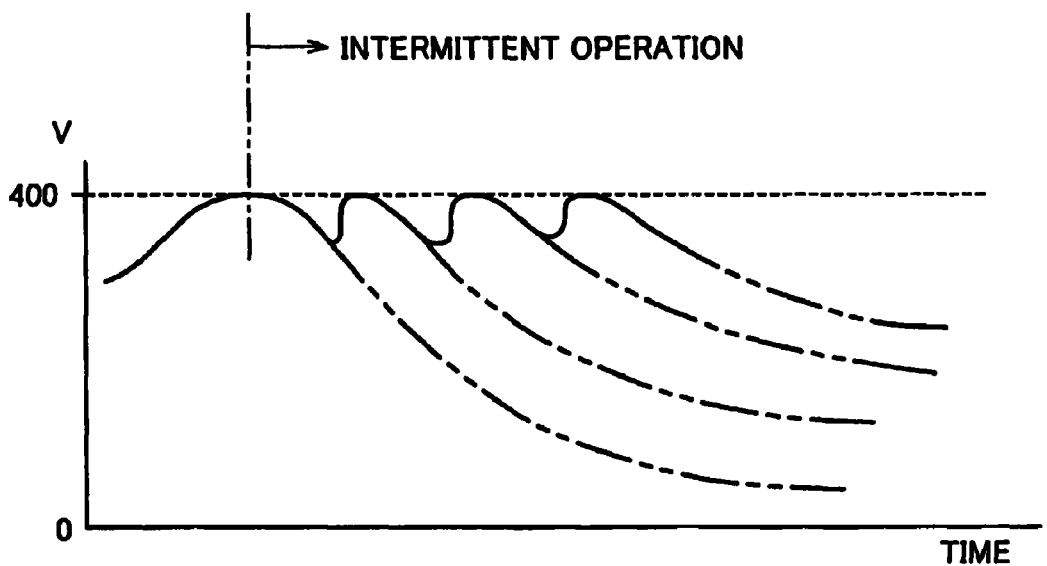
FIG. 5 is a graph explaining an example in which hydrogen gas is intermittently supplied in order to maintain open circuit voltage (OCV) of a fuel cell at a predetermined value.

Meanwhile, a power generation source (a motor and a power source) needs to respond to operation of an accelerator and start operation in the electric vehicle. Therefore, as shown in FIG. 5, even while electric power supply from the fuel cell to the motor is stopped, the auxiliary machinery is intermittently operated such that fuel gas is intermittently supplied to the fuel cell, and the fuel cell maintains open circuit voltage (OCV) at a predetermined value, for example, 400 volts.

Figure 6:
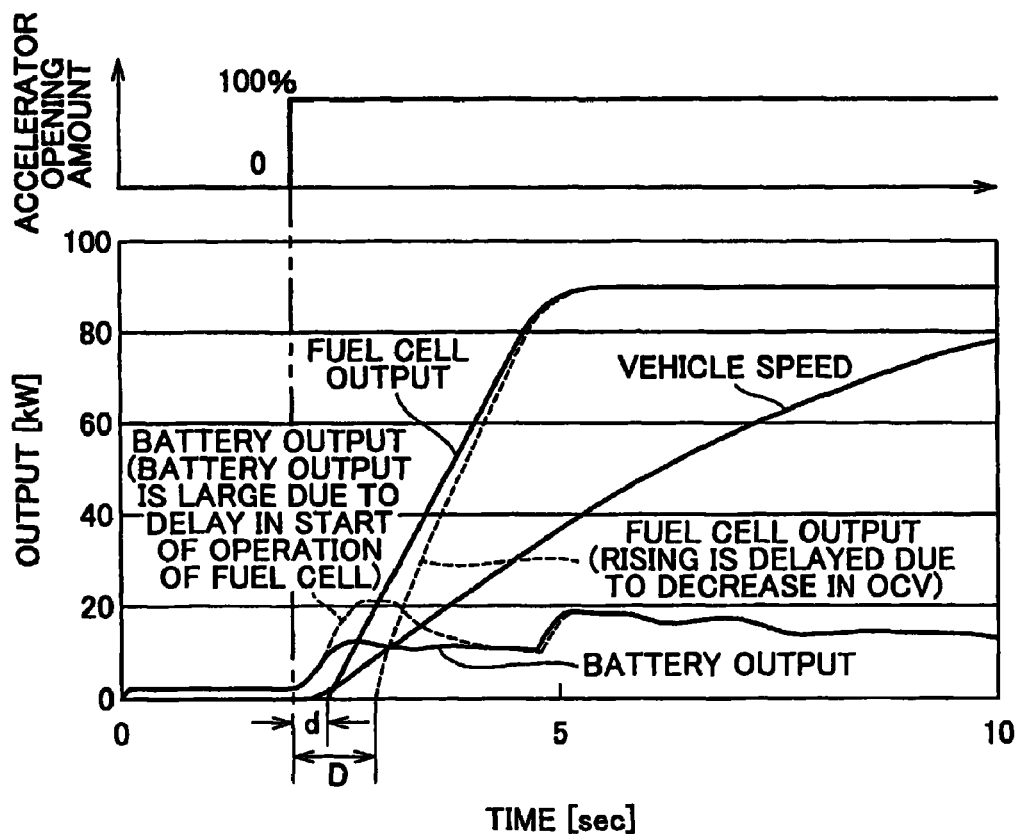
FIG. 6 is a graph explaining a characteristic in which a start of operation of the fuel cell (rising of output) is delayed due to a decrease in the open circuit voltage of the fuel cell.

FIG. 6 shows a starting response characteristic of the fuel cell when the vehicle takes off with the accelerator being fully depressed (i.e., with the accelerator opening amount being 100%). In FIG. 6, a solid line indicates a fuel cell output characteristic in a case where the fuel cell is started while the open circuit voltage (OCV) is maintained at a predetermined value, and a dashed line indicates a fuel cell output characteristic in a case where the fuel cell is started after the open circuit voltage has decreased (see a double dashed line in FIG. 5). While the open circuit voltage is maintained at the predetermined value in the fuel cell, a response delay d occurs. Meanwhile, while the open circuit voltage is not maintained at the predetermined value, a response delay D, which is larger than the response delay d, occurs due to the decreased open circuit voltage. Also, when the open circuit voltage of the fuel cell decreases, output (workload) of the secondary battery increases when the motor is started. Accordingly, in order to obtain the good starting response characteristic of the fuel cell, fuel gas needs to be unnecessarily consumed for maintaining the open circuit voltage at the predetermined value. Even when the fuel cell is intermittently operated such that electric power is supplied from the fuel cell only in the region where the efficiency of the fuel cell system is high, the fuel efficiency is not improved.

Accordingly, in the embodiment described below, when electric power supply from the fuel cell to the load is stopped during the intermittent operation of the fuel cell, fuel gas supply to the fuel cell is completely stopped. Also, the reference value Ps of the required load, based on which the operation of the fuel cell is started during the intermittent operation of the fuel cell, is adjusted such that a time at which the operation of the fuel cell is started is advanced, according to the open circuit voltage of the fuel cell that is decreased due to complete stop of the fuel gas supply. Thus, a delay in the start of the operation of the fuel cell is suppressed as much as possible. The reference value for starting the operation of the fuel cell and the reference value for stopping the operation of the fuel cell during the intermittent operation may be different from each other in order to prevent hunting.

Figure 1:
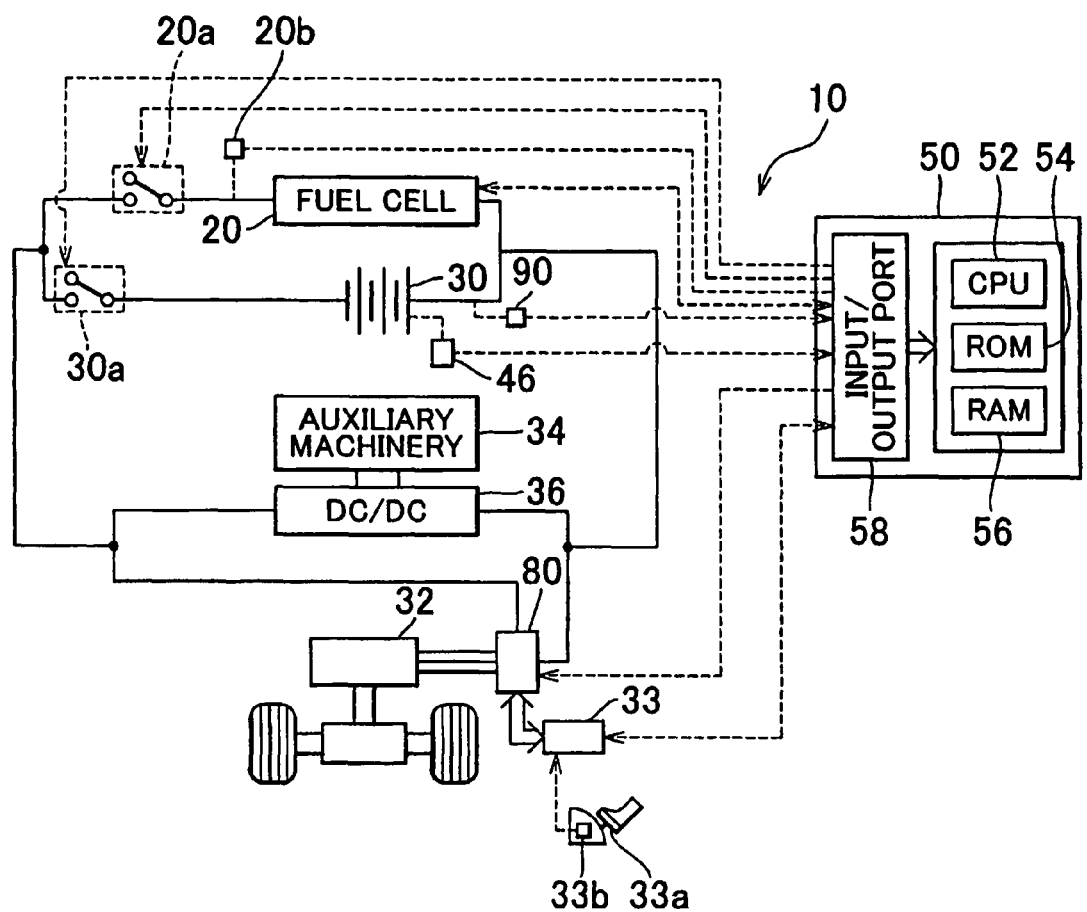
FIG. 1 is a block diagram explaining an electric vehicle including a fuel cell system.

FIG. 1 is a block diagram schematically showing a configuration of an electric vehicle including a fuel cell system 10 according to an exemplary embodiment of the invention. The fuel cell system according to the embodiment is mounted in the vehicle, and functions as a power source for driving the vehicle. The fuel cell system 10 mainly includes a fuel cell 20, a secondary battery 30, a motor 32 for driving the vehicle, auxiliary machinery 34, a DC/DC converter 36, a remaining capacity monitor 46, a control portion 50, an inverter 80, and an electric current sensor 90. Hereinafter, each of components constituting the fuel cell system 10 will be described.

The fuel cell 20 is a proton-exchange membrane fuel cell, and has a stack structure in which plural unit cells are stacked. The unit cell is a constitutional unit of the fuel cell. The unit cell includes a separator, an anode, an electrolyte membrane, a cathode, a separator (all of them are not shown), and the like. In the fuel cell 20, fuel gas containing hydrogen is received on the cathode side, oxidizing gas containing oxygen is received on the anode side, and electromotive force is obtained by electrochemical reaction described below.

$$H_2 \rightarrow 2H^+ + 2e^- \quad (1)$$

$$(\tfrac{1}{2})O_2 + 2H^+ + 2e^- \rightarrow H_2O \quad (2)$$

$$H_2 + (\tfrac{1}{2})O_2 \rightarrow H_2O \quad (3)$$

The equation (1) indicates reaction on the cathode side, the equation (2) indicates reaction on the anode side, and the equation (3) indicates reaction which occurs in the entire fuel cell.

In the fuel cell 20, the output can be controlled by adjusting the fuel gas amount and the oxidizing gas amount according to the magnitude of the load to which the fuel cell 20 is connected. This control of the output is performed by the control portion 50. That is, the control portion 50 outputs driving signals to the air compressor and an electromagnetic valve provided in a fuel supply passage, which will be described below, so as to adjust the driving amount and the opening/closing state thereof. Thus, the supply gas amount is controlled, and accordingly the output of the fuel cell 20 is controlled.

The fuel cell 20 is connected to the secondary battery 30, the motor 32, and the auxiliary machinery 34. The fuel cell 20 supplies electric power to the motor 32 and the auxiliary machinery 34, and charges the secondary battery 30 with electric power according to the states of these loads. In this case, the fuel cell 20 is connected to the motor 32 and the auxiliary machinery 34 via a switch 20a. After the control portion 50 controls opening/closing of the switch 20a and a switch 30a on the secondary battery side, electric power is supplied to the motor 32 and the auxiliary machinery 34, and the secondary battery 30 is charged with electric power. Also, a voltmeter 20b is connected to an output end of the fuel cell 20, and detection voltage is supplied to the control portion 50.

The secondary battery 30 is a power source device (electric power storing means) for supplying electric power to the motor 32 and the auxiliary machinery 34 as well as the fuel cell 20. Although a lead acid battery is used in the embodiment, a secondary battery of another type, such as a nickel-cadmium storage battery, a nickel-hydrogen storage battery, or a lithium secondary battery may be used. The capacity of the secondary battery 30 is decided according to the size of the vehicle including the fuel cell system 10, an assumed running condition, required performance of the vehicle (the maximum speed, a running distance, and the like), and the like. Instead of the secondary battery 30, a capacitor or an ultra capacitor having a large capacity may be used.

The motor 32 is a three-phase synchronous motor. Direct electric current outputted by the fuel cell 20 and the secondary battery 30 is converted to three-phase alternate electric current by the inverter 80 that will be described below, and the three-phase alternate electric current is supplied to the motor 32. When the motor 32 receives supply of such electric power, the motor 32 generates rotational driving force. The rotational driving force is transmitted to front wheels and/or rear wheels of the vehicle via an axle of the vehicle including the fuel cell system 10, and the rotational driving force serves as power for driving the vehicle. The motor 32 is controlled by a control device 33. The control device 33 is connected to an accelerator pedal position sensor 33b for detecting an operation amount of an accelerator pedal 33a, and the like. The control device 33 is connected also to the control portion 50, and various types of information concerning driving of the motor 32 and the like is transmitted between the control device 33 and the control portion 50. For example, the operation amount of the accelerator pedal 33a is transmitted to the control portion 50 as an amount of required driving power.

The auxiliary machinery 34 supplies fuel gas and the like to the fuel cell 20 so as to operate the fuel cell 20.

FIG. 2 is a block diagram schematically showing an example of the configuration of the auxiliary machinery in the case where high-pressure hydrogen is used as fuel. Hydrogen reserved in a high-pressure hydrogen tank 34a is supplied to a cathode group of the fuel cell 20 via an opening/closing valve 34b, a pressure reducing valve 34c for adjusting the pressure, and an opening/closing valve 34d. The opening/closing and the opening/closing amounts of these valves are electromagnetically controlled by the control portion 50 that will be described below. The exhaust hydrogen gas that is not used by the fuel cell 20 is collected via a gas-liquid separator 34e, and is returned to the fuel cell 20 using a pump 34f, and reused. Meanwhile, foreign matter is removed from air (oxygen) supplied to an anode group by an air filter 34g. Then, the air (oxygen) is compressed by a compressor 34h, humidified by a humidifier 34i, and then supplied to the fuel cell 20. The compressor 34h can adjust the pressure of the oxidizing gas supplied to the fuel cell 20.

FIG. 3 is a block diagram schematically showing an example of the configuration of the auxiliary machinery in the case where a reformer is used as a hydrogen gas supply source. The fuel cell system 10 mainly includes the aforementioned fuel cell 20, a methanol tank 34$j$, a water tank 34$k$, a reformer 34$l$, and an air compressor 34$m$. In addition, the fuel cell system 10 further includes pumps 34$n$, 34$o$ which supply methanol and water from the tank to the reformer 34$l$, and an electromagnetic valve 34$p$ which adjusts an amount of hydrogen supplied from the reformer 34$l$ to the fuel cell 20. The air compressor 34$m$ can adjust the pressure of the oxidizing gas supplied to the fuel cell 20.

The auxiliary machinery 34 includes a massflow controller, a water pump (not shown), and the like, in addition to the electromagnetic valve, the air compressor, and the pumps described above. The water pump pressurizes a coolant, and causes the coolant to circulate in the fuel cell 20. Since the coolant is caused to circulate, and heat exchange is performed in the fuel cell 20, a temperature inside the fuel cell 20 is controlled to be equal to or lower than a predetermined temperature. The massflow controller adjusts the pressure and flow amount of the fuel gas supplied to the fuel cell 20, as described above. In FIG. 1, the fuel cell 20 and the auxiliary machinery 34 are illustrated independently of each other. However, these devices related to control of the operating state of the fuel cell 20 can be referred to also as peripheral devices for the fuel cell 20.

The DC/DC converter 36 converts voltage of the electric energy output by the fuel cell 20 and the secondary battery 30, and supplies the electric energy to the auxiliary machinery 34. In general, the voltage required for driving the motor 32 is approximately 200 volts to 300 volts, and the fuel cell 20 and the secondary battery 30 output the voltage corresponding to this required voltage. However, since the voltage for driving the auxiliary machinery 34 such as the pump, the compressor, and the electromagnetic valve is approximately 12 volts, the voltage output from the fuel cell 20 and the secondary battery 30 cannot be supplied to the auxiliary machinery 34 as it is. Accordingly, the voltage is decreased by the DC/DC converter 36.

The motor 32 can be connected to, and can be disconnected from the fuel cell 20 and the secondary battery 30 by turning the aforementioned switch 20$a$ on the fuel cell side and the switch 30$a$ on the secondary battery side on and off. The connection state of each of the aforementioned switches is controlled by the control portion 50.

The remaining capacity monitor 46 detects a remaining capacity of the secondary battery 30, and is constituted by an SOC meter. The SOC meter accumulates charging/discharging electric current values and charging/discharging time in the secondary battery 30. On the basis of this value, the control portion 50 calculates the remaining capacity of the secondary battery 30. The remaining capacity monitor 46 may be constituted by a voltage sensor instead of the SOC meter. As the remaining capacity of the secondary battery 30 decreases, the voltage value decreases. Therefore, the remaining capacity of the secondary battery 30 can be detected by measuring the voltage using this characteristic. Such a voltage sensor is connected to the control portion 50, and the relation between the voltage value detected by the voltage sensor and the remaining capacity is stored in the control portion 50 in advance, whereby the control portion 50 can obtain the remaining capacity of the secondary battery 30 based on the measured value input from the voltage sensor. Alternatively, the remaining capacity monitor 46 may detect the remaining capacity by measuring specific gravity of an electrolyte of the secondary battery 30.

The control portion 50 is configured as a logic circuit mainly including a microcomputer, and includes a CPU 52, ROM 54, RAM 56, and input/output port 58. The CPU 52 performs predetermined calculations and the like according to control programs that are set in advance. The control programs and control data, which are necessary when the CPU 52 performs various calculations, are stored in the ROM 54. Various data, which is necessary when the CPU 52 performs various calculations, is temporarily read and written in the RAM 56. The input/output port 58 receives detection signals and the like from various sensors such as the output voltmeter 20$b$ and the remaining capacity monitor 46. In addition, the input/output port 58 outputs driving signals to the inverter 80 and the like according to the result of the calculations, thereby controlling the driving state of each portion of the fuel cell system.

In FIG. 1, the control portion 50 receives signals from the output voltmeter 20$b$, the remaining capacity monitor 46, and the electric current sensor 90, outputs a driving signal to the inverter 80, and transmits a signal to the control device 33 and receives a signal from the control device 33. However, the control portion 50 performs various other controls in the fuel cell system. Main controls which are not shown in FIG. 1 but are performed by the control portion 50 include a control of an operating state of the fuel cell 20. As described above, the control portion 50 controls the oxidizing gas amount and the fuel gas amount by outputting driving signals to the air compressor and the massflow controller. In the case where the reformer is used, the control portion 50 controls the amounts of methanol and water supplied to the reformer 34$l$, and manages the temperature of the fuel cell 20 and the temperature of the reformer 34$l$.

The inverter 80 converts direct electric current supplied from the fuel cell 20 and the secondary battery 30 to three-phase alternate electric current, and supplies the three-phase alternate electric current to the motor 32. Based on the instruction from the control portion 50, the inverter 80 adjusts the amplitude (actually the pulse width) and frequency of the three-phase alternate electric current supplied to the motor 32, thereby controlling the driving force generated by the motor 32. The inverter 80 is configured using six switching elements (for example, bipolar MOSFETs (IGBTs)) as main circuit elements. The direct electric current supplied from the fuel cell 20 and the secondary battery 30 is converted to the three-phase alternate electric current having a given amplitude and frequency by the switching operation of these switching elements. Each of the switching elements included in the inverter 80 is connected to the control portion 50 via a conductive line, and switching timing of each switching element is controlled using the driving signal from the control portion 50.

The connection state between the inverter 80 and the fuel cell 20 or the secondary battery 30 is decided by controlling the aforementioned switches 20$a$, 30$a$. That is, the inverter 80 can be connected to the fuel cell 20, the inverter 80 can be connected to the secondary battery 30, and the inverter 80 can be connected to both the fuel cell 20 and the secondary battery 30 at the same time. While the inverter 80 and the fuel cell 20 and/or the secondary battery 30 are connected in the aforementioned manner, output control of the fuel cell 20 (control for operating the fuel cell 20 to generate electric power) is arbitrarily performed, and output control of the secondary battery 30 (control for turning output ON and OFF) is also arbitrarily performed.

The electric current sensor 90 detects output electric current from the secondary battery 30. The output state of the secondary battery 30 may be a discharging state or a charging state. However, hereinafter, electric current output from the secondary battery 30 in the charging state and that in the discharging state will be both referred to as "output electric current". The electric current sensor 90 is connected to the control portion 50, and the electric current value detected by the electric current sensor 90 is input to the control portion 50. The input electric current value is used for determining the charging/discharging state of the secondary battery 30.

Figure 7:
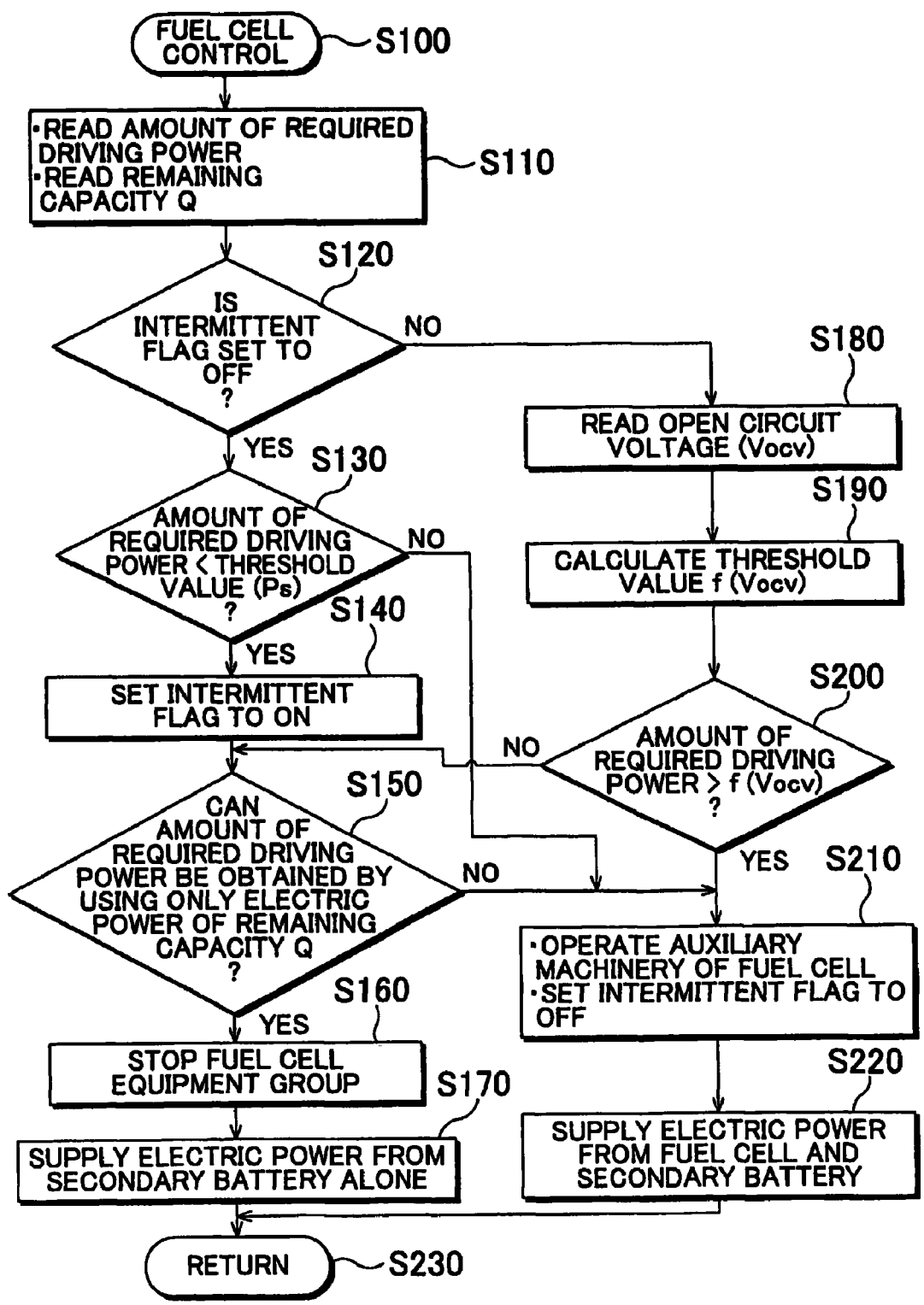
FIG. 7 is a flowchart explaining a control for intermittently operating the fuel cell and starting the fuel cell early according to a decrease in the open circuit voltage, the control being performed by a control portion.

Next, a fuel cell control performed by the fuel cell system 10 having the aforementioned configuration will be described. FIG. 7 is a flowchart showing processes of the fuel cell control. The fuel cell control starts to be performed by the CPU 52 in a vehicle including the fuel cell system 10 when a predetermined start switch for starting the fuel cell system is turned on, and is performed at predetermined time intervals, for example, at time intervals of 10 μsec (step S100).

When the routine is performed, first, the control portion 50 reads the amount of driving power required by a driver of an electric vehicle including the fuel cell system 10 through an accelerator operation, and reads a remaining capacity Q of the secondary battery 30 (step S110). The required driving power is power (load electric power) for rotating the motor 32 of the vehicle according to the request of the driver. The amount of required driving power is obtained using electric power generated by the fuel cell 20 and electric power discharged from the secondary battery 30. In this case, the amount of required driving power is determined by inputting the operation amount of the accelerator pedal 33a (output of the accelerator pedal position sensor 33b) into the control portion 50 via the control device 33. Also, the remaining capacity Q of the secondary battery 30 is calculated by reading the output value of the remaining capacity monitor 46.

Subsequent to the calculation of the remaining capacity Q, a determination is made as to a set state of an intermittent flag indicating that the fuel cell 20 is in an intermittent operation mode, and is operated intermittently (step S120). The intermittent flag is set and reset by the process that will be described later. When the intermittent flag is set (i.e., when the flag is on), the fuel cell 20 needs to be operated intermittently. When the intermittent flag is reset (i.e., when the flag is off), the fuel cell 20 needs to be operated continuously.

When it is determined that the intermittent flag is reset (i.e., the fuel cell 20 is operated continuously; YES in step S120), it is determined whether the amount of required driving power is smaller than a threshold value Ps which is a determination reference value (step S130). As shown in FIG. 4C, the threshold value Ps is a boundary value of the fuel cell output in the low load region where the efficiency of the fuel cell system is low due to low output of the fuel cell 20. The threshold value Ps is used as a reference for determining whether electric power supply from the fuel cell 20 needs to be stopped, and the intermittent operation mode needs to be performed. For example, the threshold value Ps is set to a value equivalent to approximately 10% of the electric power generating capacity (electric power supply capacity). The threshold value Ps may be set in various manners according to the charging/discharging capability of the secondary battery 30, the remaining capacity Q read in step S110, or the like. Thus, the invention is not limited to the aforementioned threshold value Ps.

When an affirmative determination is made in step S130 (i.e., YES in step S130), the amount of required driving power is smaller than the threshold value Ps, though the fuel cell 20 is operated continuously since it is determined that the intermittent flag is off in step S120. Accordingly, in this case, the intermittent flag is set to on so as to indicate that the operation mode of the fuel cell 20 needs to be changed from the continuous operation mode to the intermittent operation mode (step S140). Next, the remaining capacity Q read in step S110 and the required driving power are compared with each other, and it is determined whether the motor 32 can be rotated according to the amount of required driving power using only electric power of the remaining capacity Q of the secondary battery 30 (step S150). That is, it is determined whether the amount or required driving power can be obtained using only the electric power of the remaining capacity Q.

When it is determined that the amount of required driving power can be obtained using only the electric power of the remaining capacity Q in step S150 (i.e., YES in step S150), the operation of the fuel cell equipment group including the fuel cell 20 and the auxiliary machinery (peripheral devices) of the fuel cell 20 such as a pump and an air compressor is stopped, and supply of the fuel gas to the fuel cell 20 is stopped in the low electric power generation region. The switch 20a is opened, and supply of electric power from the fuel cell 20 to the motor 32 is stopped. The open circuit voltage of the fuel cell 20 is detected by the voltmeter 20b, and is transmitted to the control portion 50 (step S160). Subsequently, the switch 30a is closed, and the electric power of the remaining capacity Q is supplied to the motor 32 from the secondary battery 30 (step S170), and the routine is terminated (S230). Thus, the motor 32 is rotated using only the electric power supplied from the secondary battery 30, and the vehicle is driven according to the amount of required driving power.

Meanwhile, when it is determined that the amount of required driving power cannot be obtained using only the electric power of the remaining capacity Q of the secondary battery 30 in step S150 (i.e., NO in step S150), the intermittent flag is set to off so as to indicate that the aforementioned fuel cell equipment group needs to be operated so as to generate electric power, and the operation mode of the fuel cell 20 needs to be changed to the continuous operation mode, in order to use both the secondary battery 30 and the fuel cell 20 (step S210). Thus, the motor 32 can be rotated and the vehicle can be driven according to the amount of required driving power, using the electric power of the remaining capacity Q of the secondary battery 30 and the electric power generated by the fuel cell 20.

Subsequent to step S210, in order to obtain the amount of required driving power using the electric power of the remaining capacity Q of the secondary battery 30 and the electric power generated by the fuel cell 20, the switches 20a and 30a are closed such that the electric power is supplied to the motor 32 from the secondary battery 30 and the fuel cell 20 (step S220). Then, the routine is terminated (S230). More specifically, since the amount of required driving power and the remaining capacity Q are read and are already known in step S110, the amount of electric power that needs to be generated by the fuel cell 20 is decided based on the amount of required driving power and the remaining capacity Q. Accordingly, the aforementioned supply amount of fuel gas for generating the decided amount of electric power is calculated, the aforementioned auxiliary machinery (peripheral devices) is operated according to the result of the calculation, and the decided amount of electric power is generated by the fuel cell 20. Thus, the motor 32 is rotated using the electric power supplied from the secondary battery 30 and the fuel cell 20, and the vehicle is driven according to the amount of required driving power.

When it is determined that the amount of required driving power is equal to or larger than the threshold value Ps in step S130, the fuel cell 20 is operated so as to generate electric power in the region where the efficiency of the fuel cell system 10 is high in order to obtain the amount of required driving power. Accordingly, the routine proceeds to step S210 in order to obtain the amount of required driving power using the electric power of the secondary battery 30 and the electric power generated by the fuel cell 20. Thus, the motor 32 is rotated using the electric power supplied from the secondary battery 30 and the fuel cell 20, and the vehicle is driven according to the amount of required driving power (S220).

Meanwhile, when the control portion 50 determines that the intermittent flag is set to on (the intermittent operation is performed) in step S120 (i.e., NO in step S120), the control portion 50 reads output voltage Vocv of the fuel cell which is supplied from the voltmeter 20b to the control portion 50 in order to set a threshold value Pon for determining whether the operation of the fuel cell needs to be started according to the present open circuit voltage (OCV) of the fuel cell 20 whose operation has been stopped (S180).

Figure 8:
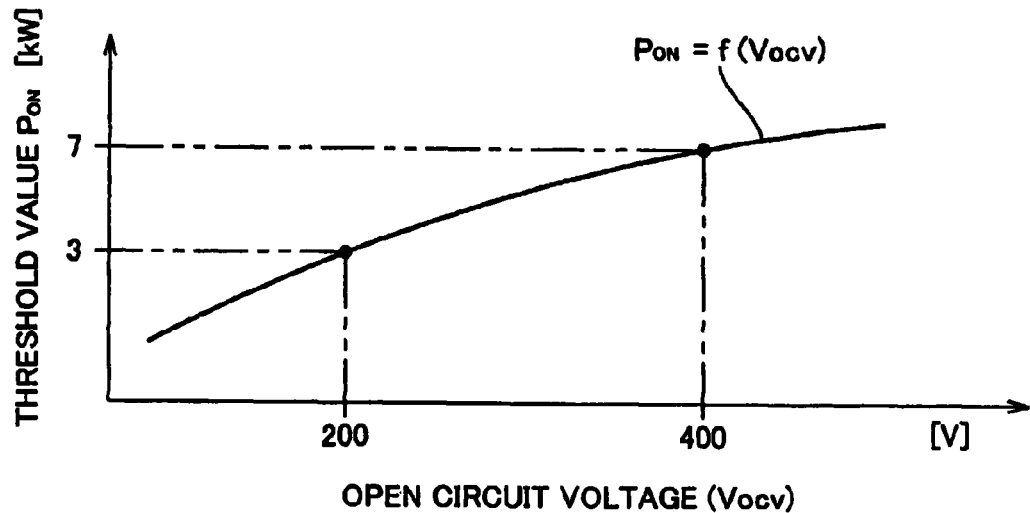
FIG. 8 is a graph explaining an example in which a reference value (threshold value) for starting the operation of the fuel cell is set according to the open circuit voltage of the fuel cell.

The control portion 50 calculates the threshold value Pon based on the output voltage Vocv of the fuel cell 20. FIG. 8 is a graph explaining an example of a relation between the open circuit voltage Vocv and the threshold value that needs to be set. The ROM 54 of the control portion 50 stores the graph as a map data or a function Pon=f(Vocv) in advance. The function Pon=f(Vocv) has a characteristic that the threshold value Pon is decreased with a decrease in the open circuit voltage. Thus, the threshold value Pon for starting the operation of the fuel cell is decreased with a decrease in the open circuit voltage of the fuel cell whose operation has been stopped. Since the threshold value Pon is decreased and the time at which the operation of the fuel cell 20 is started is relatively advanced, it is possible to decrease a delay amount in rising of the output of the fuel cell 20, as described later. The optimal characteristic of the function f(Vocv) can be identified in the design of the system or through experiments. In the example shown in FIG. 8, when the open circuit voltage Vocv of the fuel cell 20 is 400 volts, the threshold value Pon is set to 7 kilowatts. When the open circuit voltage Vocv is 200 volts, the threshold value Pon is set to 3 kilowatts. The control portion 50 sets the threshold value Pon in this manner (S190).

Figure 9:
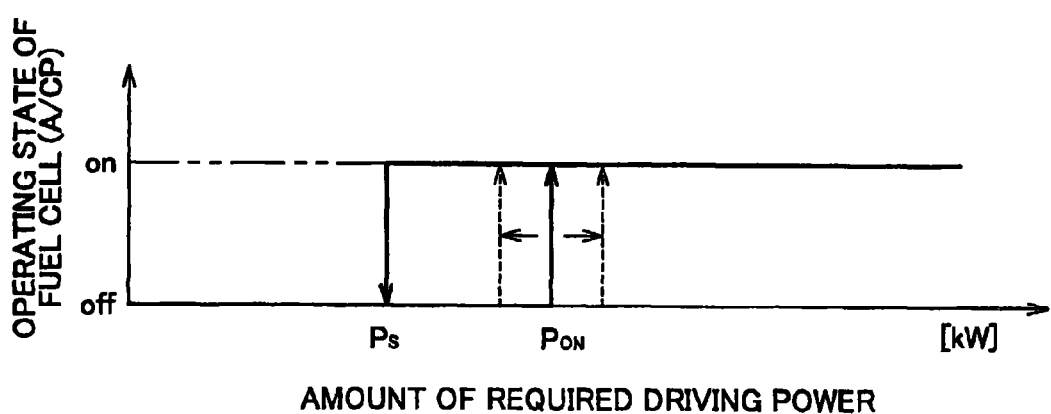
FIG. 9 is a diagram explaining an example in which the reference value for starting the operation of the fuel cell during the intermittent operation of the fuel cell system is changed according to the open circuit voltage.

FIG. 9 is a diagram explaining an example in which the threshold value Pon is adjusted according to the present open circuit voltage of the fuel cell 20. When the present open circuit voltage Vocv is low, the threshold value Pon is set to be relatively low. When the present open circuit voltage Vocv is high (for example, rated output voltage), the threshold value Pon is set to be relatively high.

Next, the control portion 50 determines whether the amount of required driving power is larger than the threshold value Pon (step S200). When an affirmative determination is made (i.e., YES in step S200), the amount of required driving power is larger than the threshold value Pon though the fuel cell 20 needs to be operated intermittently since it is determined that the intermittent flag is on in step S120. Accordingly, the routine proceeds to step S210 in order to obtain the large amount of required driving power using the electric power of the secondary battery 30 and the electric power generated by the fuel cell 20.

As described above, the control portion 50 causes the aforementioned fuel cell equipment group to be operated so as to generate electric power, and sets the intermittent flag to off in order to indicate that the operation mode of the fuel cell 20 needs to be changed to the continuous operation mode (step S210) in order to use the secondary battery 30 and the fuel cell 20. Thus, the motor 32 can be rotated and the vehicle can be driven according to the amount of required driving power, using the electric power of the remaining capacity Q of the secondary battery 30 and the electric power generated by the fuel cell 20.

Subsequent to step S210, in order to obtain the amount of required driving power using the electric power of the remaining capacity Q of the secondary battery 30 and the electric power generated by the fuel cell 20, the switches 20a and 30a are closed such that the electric power is supplied to the motor 32 from the secondary battery 30 and the fuel cell 20 (step S220), after which the routine is terminated (S230).

More specifically, since the amount of required driving power and the remaining capacity Q are already known in step S110, the amount of electric power that needs to be generated by the fuel cell 20 is decided based on the amount of required driving power and the remaining capacity Q. Accordingly, the aforementioned supply amount of fuel gas for generating the decided amount of electric power is calculated, the aforementioned auxiliary machinery (peripheral devices) is operated according to the result of the calculation, and the decided amount of electric power is generated by the fuel cell 20. Thus, the motor 32 is rotated using the electric power supplied from the secondary battery 30 and the fuel cell 20, and the vehicle is driven according to the amount of required driving power.

When a negative determination is made in step S200 (i.e., NO in step S200), the amount of required driving power remains small. Accordingly, in order to obtain the amount of required driving power using the electric power of the remaining capacity Q of the secondary battery 30 while the fuel cell equipment group including the fuel cell 20 and the peripheral devices thereof is kept stopped, the routine proceeds to step S150, and the aforementioned subsequent processes are performed. Thus, in the fuel cell system 10, while the fuel cell equipment group is stopped (step S160), the motor 32 is rotated using the electric power of the remaining capacity Q of the secondary battery 30 (step S170), and the vehicle is driven according to the amount of required driving power. When the electric power of the remaining capacity Q is not sufficient (i.e., NO in step S150), the motor 32 is rotated using the electric power supplied from the secondary battery 30 and the fuel cell 20 (step S210 and step S220), the vehicle is driven according to the amount of required driving power.

As described above, in the fuel cell system 10 according to the embodiment, it is decided to perform or stop the operation of the fuel cell equipment group including the fuel cell 20 and the peripheral devices thereof according to the amount of driving power required by the driver through the depression operation of the accelerator pedal 33a. That is, in the case where the amount of required driving power is large and accordingly the load required of the fuel cell 20 is high (i.e., NO in step S130), the fuel cell equipment group is operated such that the fuel cell 20 generates electric power (step S210), and the motor 32 is rotated and the vehicle is driven using the electric power generated by the fuel cell 20 and the electric power of the secondary battery 30 (step S220). Accordingly, in this case, the fuel cell 20 can be efficiently operated so as to generate electric power in the high load region. Thus, it is possible to improve the efficiency of the fuel cell system 10, and accordingly, it is possible to improve the efficiency of the electric vehicle including the fuel cell system.

Meanwhile, in the case where the load required of the fuel cell 20 is low (i.e., YES in step S130), when the motor 32 can be rotated using only the electric power of the remaining capacity Q of the secondary battery 30 (i.e., YES in step S150), the operation of the fuel cell equipment group including the fuel cell 20 and the peripheral devices thereof is stopped (step S160), the motor 32 is rotated using only the electric power of the remaining capacity Q of the secondary battery 30 (step S170) such that the vehicle is driven according to the amount of required driving power. Accordingly, since the fuel cell 20 is prevented from being operated so as to generate electric power in the low load region, the fuel cell 20 is prevented from unnecessarily generating electric power. Thus, it is possible to improve the efficiency of the fuel cell system 10, and accordingly, it is possible to improve the efficiency of the electric vehicle including the fuel cell system 10. Further, since the operation of the peripheral devices such as the air compressor 66 is also stopped when the operation of the fuel cell 20 is stopped, energy required for operating the peripheral devices is not used, whereby the efficiency of the fuel cell system can be further improved.

Even in the case where the amount of required driving power is large and accordingly the load required of the fuel cell 20 is low, when the electric power of the remaining capacity Q of the secondary battery 30 is insufficient (i.e., NO in step S150), the fuel cell equipment group is operated, and the motor 32 is rotated using the electric power supplied from the secondary battery 30 and the fuel cell 20 (step S210 and step S220) such that the vehicle is driven according to the amount of required driving power. Accordingly, since the vehicle can be driven in a driving state which has been expected by the driver, the driver does not feel uncomfortable.

Also, in the embodiment, in the case where the fuel cell 20 is operated when the amount of required driving power is increased after the operation of the fuel cell 20 is stopped since the amount of required driving power is smaller than the threshold value Ps, the operation of the fuel cell 20 is kept stopped until the amount of required driving power becomes larger than the threshold value Pon (step S200). Accordingly, even when the amount of required driving power increases or decreases in the vicinity of the threshold value Ps, the fuel cell 20 can be prevented from being operated and stopped repeatedly, that is, hunting can be prevented. Therefore, it is possible to prevent a problem due to hunting, for example, occurrence of noise in the peripheral devices of the fuel cell 20 such as the pump.

In the embodiment, in the case where the operation of the fuel cell 20 is restarted when the amount of required driving power is increased after the operation of the fuel cell 20 is completely stopped since the amount of required driving power is smaller than the threshold value Ps, the threshold value Pon for determining whether the operation of the fuel cell 20 needs to be started is adjusted according to the present open circuit voltage (OCV) (step S180 and step S190). Accordingly, it is possible to suppress, as much as possible, the delay in the start of the operation of the fuel cell due to a decrease in the open circuit voltage (OCV) of the fuel cell 20 (see FIG. 6). Thus, it is possible to obtain the good starting characteristic (response) of the fuel cell, and to improve the fuel efficiency of the fuel cell.

Also, instead of using the aforementioned fixed threshold value Ps, the threshold value Ps may be variable. For example, the threshold value Ps may be set to a value which is lower, by a predetermined value α, than the threshold value Pon which is adjusted according to the remaining electromotive force (i.e., Pon−α). In this case, even when the threshold value Pon is changed, a margin α for preventing hunting can be always obtained. Also, if hunting does not occur, the threshold value Ps may be set to the same value as the threshold value Pon.

The invention claimed is:
1. A fuel cell system comprising:
a fuel cell;
an electric power supplying device configured to supply electric power to a load from the fuel cell and the electric power storing device; and
a threshold value adjusting device configured to adjust a reference value according to an internal electromotive voltage of the fuel cell, such that the reference value decreases as the internal electromotive voltage of the fuel cell, when stopped, decreases,
wherein the electric power supplying device includes intermittent operation device configured to stop operation of the fuel cell when a driving power required by the load is smaller than the reference value, and configured to start the stopped operation of the fuel cell when the driving power required by the load is equal to or larger than the reference value.

2. The fuel cell system according to claim 1, wherein
the threshold value adjusting device decreases the reference value according to a decrease in the internal electromotive force in the fuel cell such that a wait time at which the operation of the fuel cell is started is decreased.

3. The fuel cell system according to claim 1, wherein
the threshold value adjusting device stores data related to the reference value that needs to be set according to the internal electromotive force in the fuel cell.

4. The fuel cell system according to claim 1, wherein
the reference value includes a first reference value and a second reference value that is larger than the first reference value; the intermittent operation device stops the operation of the fuel cell when the driving power required by the load is smaller than the first reference value, and starts the stopped operation of the fuel cell when the driving power required by the load is equal to or larger than the second reference value; and the threshold adjusting device adjusts the second reference value according to the internal electromotive force in the fuel cell whose operation has been stopped.

5. The fuel cell system according to claim 4, wherein
the threshold value adjusting device decreases the second reference value according to a decrease in the internal electromotive force in the fuel cell such that a wait time at which the operation of the fuel cell is started is decreased.

6. The fuel cell system according to claim 4, wherein
the threshold value adjusting device stores data related to the second reference value that needs to be set according to the internal electromotive force in the fuel cell.

7. The fuel cell system according to claim 1, wherein
the electric power storing device includes at least one of a secondary battery or a capacitor.

8. An electric vehicle comprising:
a motor that generates power for the vehicle; and
a fuel cell system that includes a fuel cell, an electric power storing device, and an electric power supplying device configured to supply electric power to the motor from the fuel cell and the electric power storing device,
wherein the electric power supplying device includes an intermittent operation device configured to stop operation of the fuel cell when a driving power required by the load including the motor is smaller than a reference value, and configured to start the stopped operation of the fuel cell when the driving power required by the load is equal to or larger than the reference value,
wherein the reference value is adjusted by a threshold value adjusting device that is configured to adjust the reference value according to an internal electromotive voltage of the fuel cell, such that the reference value decreases as the internal electromotive voltage of the fuel cell, when stopped, decreases.

9. The electric vehicle according to claim 8, wherein the reference value includes a first reference value and a second reference value that is larger than the first reference value; the intermittent operation device stops the operation of the fuel cell when the driving power required by the load is smaller than the first reference value, and starts the stopped operation of the fuel cell when the driving power required by the load is equal to or larger than the second reference value; and the threshold adjusting device adjusts the second reference value according to the internal electromotive force in the fuel cell whose operation has been stopped.

10. The fuel cell system according to claim 4, wherein the electric power storing device includes at least one of a secondary battery or a capacitor.

11. The fuel cell system according to claim 4, wherein the threshold value adjusting device increases the second reference value according to an increase in the internal electromotive force in the fuel cell.

* * * * *